Feb. 19, 1963
R. L. McILVAINE
3,077,714
GAS CLEANER
Filed April 18, 1961
2 Sheets-Sheet 1
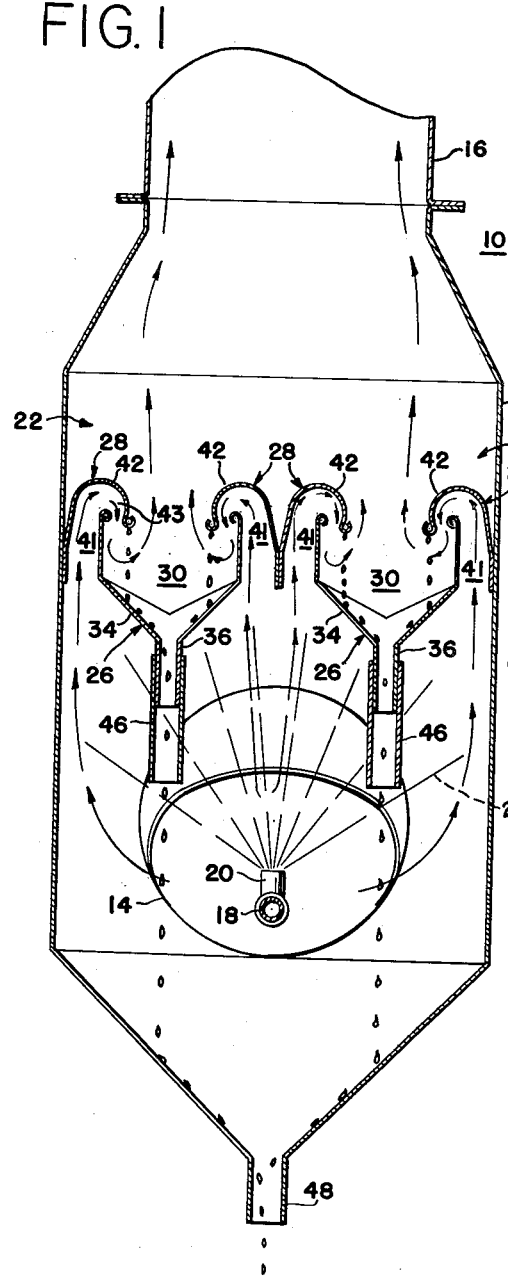
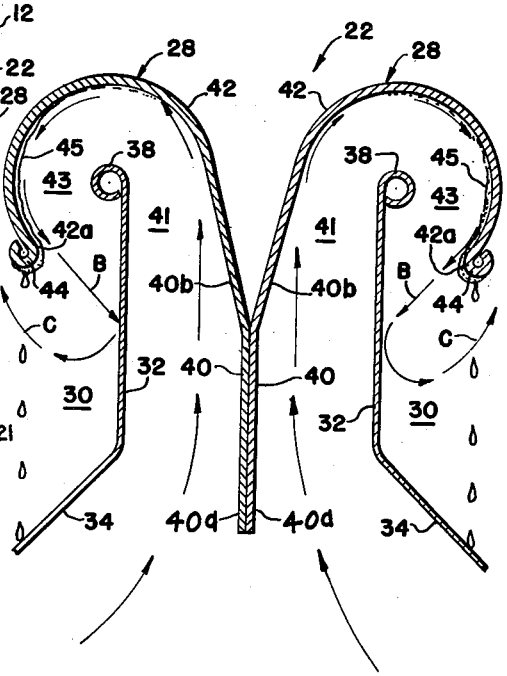
INVENTOR.
Robert L. McIlvaine
BY *Mason, Kolehmainen,
Rathburn & Wyss*
ATTORNEYS Feb. 19, 1963 R. L. McILVAINE 3,077,714
GAS CLEANER Filed April 18, 1961 2 Sheets-Sheet 2

INVENTOR.
Robert L. McIlvaine
BY
ATTORNEYS

United States Patent Office 3,077,714
Patented Feb. 19, 1963

3,077,714
GAS CLEANER
Robert L. McIlvaine, Winnetka, Ill., assignor to Herbert Simpson Corporation, Chicago, Ill., a corporation of Illinois
Filed Apr. 18, 1961, Ser. No. 103,931
8 Claims. (Cl. 55—238)

This invention relates to a gas cleaner and more particularly to a gas chamber of the wet scrubber type wherein contaminated gas is first brought in contact with scrubbing liquid to entrain the contaminated particles therein and thereafter the gas and liquid mixture is passed through a separator to remove the liquid from the gas.

It is known to clean gas by the wet scrubbing method, for example, as illustrated in my prior patent No. 2,691,423 and granted October 12, 1954. Such a known wet scrubbing process involves bringing the gas into contact with liquid particles or droplets so that the contaminant particles or aerosols in the gas collide with and are entrapped by the liquid droplets. The liquid droplets are then separated from the gas by means of an entrainment separator. The ability of any wet scrubber to remove contaminant particles therefore depends, first, on the degree of contact between the gas and the scrubbing liquid and, secondly, on the efficiency of the entrainment separator.

It is therefore an object of the present invention to provide an improved gas cleaner.

Another object of the present invention is to provide an improved gas cleaner of the wet scrubber type.

A further objeect of the present invention is to provide an improved entrainment separator for use in a gas cleaner and the like.

Further objects and advantages of this invention will become apparent as the following description proceeds and the features of novelty which characterize the invention will be pointed out with particularity in the claims annexed to and forming a part of this specification.

Briefly, according the present invention, there is provided an improved gas cleaner of the wet scrubber type wherein contaminated gas passes through a liquid spray in an enclosed housing. The contaminated gas is admitted to the housing through a gas inlet and the scrubbed gas is exhausted from the housing through a gas outlet. At least one entrainment separator separates the gas inlet and the gas outlet so that the gas must pass through the separator after it passes through the liquid spray.

The entrainment separator according to the present invention includes a liquid collecting trough member having generally vertically extending planar side wall portions with a spiral positioned tangentially relative to the side portions at the upper end thereof along the inside of the side wall portions. A centrifugal impinger is spaced adjacent each of the side portions of the trough and each includes a generally vertical planar wall portion connected at its upper end to a generally scroll shape curved portion spaced over the spiral and eccentrically positioned relative thereto to partially encircle the spiral. Moreover, the curved portion terminates horizontally below the spiral. At least one of the generally vertical wall portions of the trough and the centrifugal impinger are inclined upwardly relative to the other thereby forming an upwardly converging fluid passageway therebetween which communicates with a curved passageway of diminishing cross-sectional area formed between the curved portion of the centrifugal impinger and the spiral. The curved passageway is sufficiently long to cause a reversal in the flow of the fluid through the passageway of approximately 225°.

The improved entrainment separator performs both the function of causing intimate contact between the gas and the scrubbing liquid and additionally provides for very efficient separation of the liquid from the gas. When a gas containing contaminant particles and liquid droplets is passed through the entrainment separator, turbulence occurs at the entrance of the passageway in the upwardly converging portion thereof which promotes collision and entrapment of the contaminant particles in the droplets while the centrifugal force applied as the direction of flow is reversed causes the droplets to impinge on the scroll and form a film which moves to the open side of the scroll shape curved portion to be discharged in relatively large drops which are too heavy to be re-entrained in the gas stream.

The nature of the invention will best be understood when described in connection with the accompanying drawings, in which:

FIG. 1 is a side sectional elevational view of an improved gas cleaner according to the present invention;

FIG. 3 is a side sectional elevational view of the improved entrainment separator utilized in the gas cleaner of FIGS. 1 and 2 and drawn to a larger scale.

Figure 2:
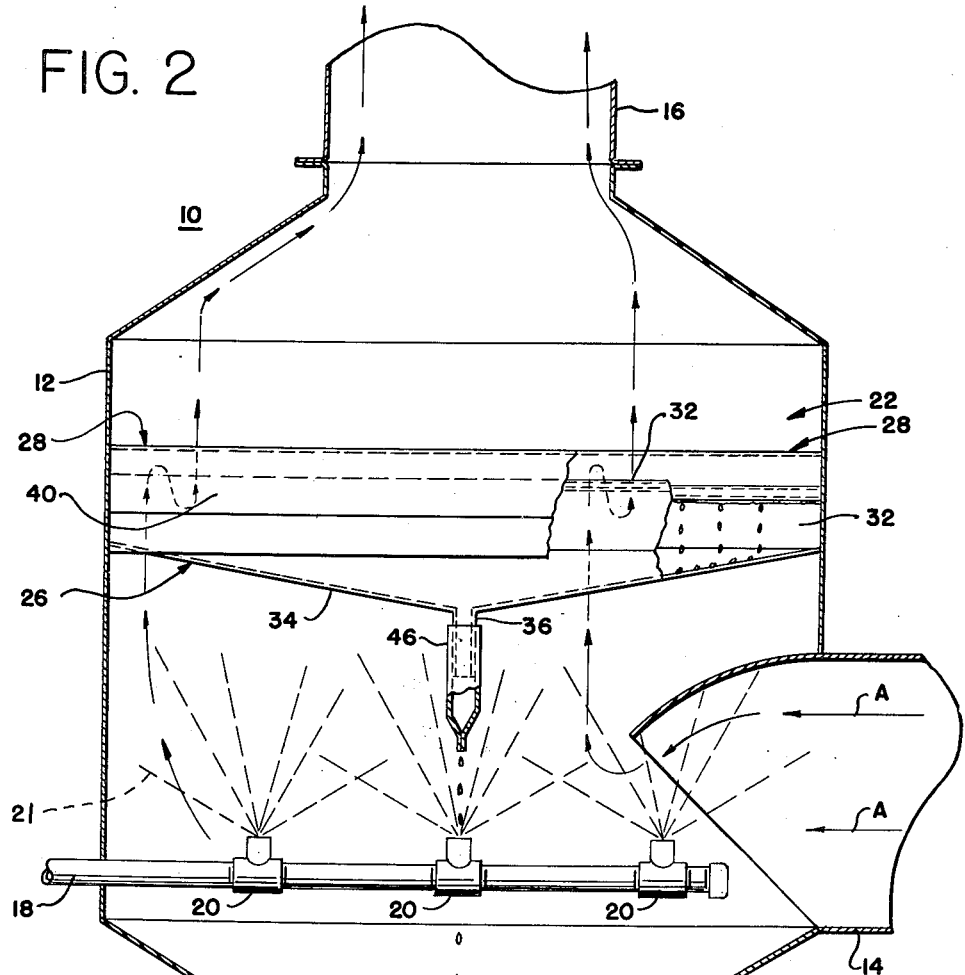
FIG. 2 is a front sectional elevational view of the improved gas cleaner of FIG. 1.

Referring now to the drawings, and particularly to the embodiments of FIGS. 1 to 3, there is illustrated an improved gas cleaner 10 including a closed housing 12 and provided with a gas inlet duct 14 at the lower end thereof and a gas exhaust duct 16 extending from the top thereof. A liquid spray pipe 18 extends into the housing 12 along the bottom thereof and is provided with a plurality of spray nozzles 20 within the housing 12. The pipe 18 is adapted to be connected to a source (not shown) of scrubbing liquid such as water. The nozzles 20 are effective to provide a fine spray of scrubbing liquid particles, illustrated in phantom in FIGS. 1 and 2 and identified as 21, within the housing 12 so that the gas entering the gas cleaner 10 through the gas inlet duct 14 first passes in intimate contact with the spray particles 21 to pick up the spray particles 21. Of course, it is understood that the gas is moved through the gas cleaner 10 by a fan (not shown) or other pressure differential.

According to the present invention, the gas cleaner 10 is provided with a plurality of improved entrainment separators, generally illustrated at 22, and dividing the housing 12 between the gas inlet duct 14 and the gas outlet duct 16 so that the gas passing through the gas cleaner 10 after picking up the particles of spray 21 must then pass through the entrainment separators 22 as it moves through the gas cleaner 10. As herein illustrated, the gas cleaner 10 includes two entrainment separators 22; however, since both are identical only one is herein described in detail. Each of the entrainment separators 22 includes a trough member 26 and an associated pair of identical centrifugal impinger members 28. The trough member 26 includes a trough portion 30 (FIGS. 1 and 3) having generally vertical planar side wall portions 32, best seen in FIG. 3, and provided with a sloping bottom surface 34 inclined downwardly toward a liquid discharge tube 36. Each of the side wall portions 32 are vertically positioned and terminate at their upper end in a spiral 38 positioned tangentially relative to the side wall portion 32 along the inner surface thereof so that the spirals 38 on opposite side wall portions 32 of each trough member 28 are confronting each other. Each of the side wall portions 32 has associated therewith a respective one of the centrifugal impinger members 28 to provide a passageway for liquid containing contaminated gas. Specifically, each centrifugal impinger member 28 includes a generally planar side wall portion 40, generally extending vertically but comprising a vertical planar section 40a and an inclined planar section 40b, inclined slightly toward the adjacent side wall portion 32 of the trough member 26 thereby to form an upwardly converging fluid passageway 41 therewith. A generally scroll shape curved portion 42 connects to the upper end of the side wall portion 40 eccentrically positioned relative to the spiral 38 and partially encircling the spiral 38 to form a generally arcuate passageway 43 therewith of diminishing cross-sectional area terminating at one end 42a of the curved portion 42.

In order to facilitate the formation of large droplets of liquid at the terminal end 42a of the curved portion 42, the curved portion 42 terminates in a bead portion 44 connected tangentially to the terminal end 42a thereof and extending radially outwardly of the curved portion 42.

In order to provide for the maximum reversal in the direction of flow of the liquid and gas mixture passing through the entrainment separator 22, the curved portion 42 of the centrifugal impinger member 28 terminates horizontally below the spiral 38 so as to terminate along a line about 45° to the horizontal with reference to the spiral 38. In this manner the liquid and gas mixture passing through the passageways 41 and 43 has a reversal in direction of approximately 225°.

It will be appreciated that according to the present invention the contaminated gas is introduced into the gas cleaner 10 through the gas cleaner duct 14, as indicated by the arrows A (FIG. 2), and is brought in contact with the spray particles 21. The liquid and gas mixture formed by this contact then proceeds through the entrainment separators 22 passing initially through the upwardly converging fluid passageway 41 and continuing into the passageway 43 of diminishing cross-sectional area formed between the curved portion 42 and the spiral 38. The contaminant particles are forced into violent contact with the liquid droplets due to the turbulent flow at the entrance of the passageway 41 and as the direction of flow is reversed the centrifugal force causes the contaminant particles and liquid droplets to impinge on the inner surface of the curved portion 42. The liquid droplets form a liquid film thereon, as indicated at 45 in FIG. 3, further tending to entrap contaminant particles impinging on the curved portion 42. The liquid film tends to be driven toward the open side of the curved portion 42. Due to the bead 44 the film forms relatively large drops of liquid at the bead 44 which then drop off and fall through the gas stream without danger of re-entrapment of the gas.

In one typical gas cleaner, gas was found to travel at approximately thirty feet per second of velocity as it was directed away from the path of the droplets and impinged on the inside of the side portion 32 of the trough member 26, as illustrated by the arrows identified at B in FIG. 3. The gas then loses velocity rapidly and was found to leave the entrainment separator area at approximately ten feet per second, as indicated by the arrows identified at C.

The particles of contaminant bearing liquid which fall from the bead portion 44 of the centrifugal impinger member 28 are collected in the trough member 26 and may be removed therefrom in any convenient manner. As illustrated in the embodiment of FIGS. 1 to 3, the trough member 26 is provided with the liquid discharge tube 36 normally closed at its lower end with a piece of tube 46 made of flexible material such as rubber. The tube is formed so as to be collapsed in its normal form, except where it is drawn over the tube 36. The difference in gas pressure occasioned by the resistance of the entrainment separators 24, which in a typical installation may be approximately 1½ inches hg., causes the tube to remain collapsed and thus prevents gas from passing upwardly through the tube 36. However, when sufficient liquid has accumulated in the tube 36, the hydrostatic pressure in the tube 36 overcomes the difference in gas pressure and the tube 46 opens releasing the liquid. The liquid falls in relatively large droplets to the bottom of the housing 12 where it is conveyed from the housing 12 through a dirty water outlet 48.

Figure 4:
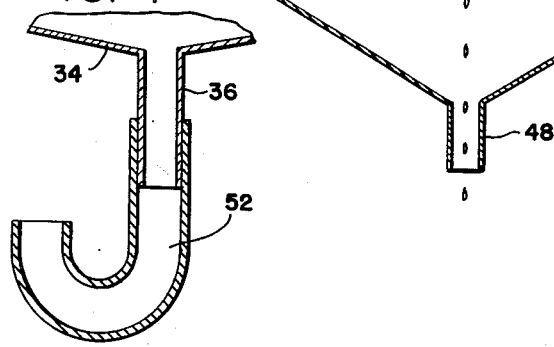
FIG. 4 is an enlarged detailed view illustrating a modified form of discharge from the liquid collecting troughs.

Alternatively, the water may be discharged from the trough member 26 through a U-shaped drain member 52 (FIG. 4) forming a liquid trap and secured to the lower end of the liquid discharge 36. The operation of the drain member 52 is similar to that of the tube 46 in the embodiments of FIGS. 1 to 3.

It will thus be seen that the improved gas cleaner according to the present invention is effective to bring the gas and the scrubbing liquid in violent contact with each other and additionally to provide an extremely efficient separation of the contaminant containing liquid from the gas.

Although certain preferred embodiments of the invention have been described by way of illustration, many modifications will occur to those skilled in the art. Moreover, although the improved entrainment separator may be used in the illustrated gas cleaner, the entrainment separator may additionally be used in other separating apparatus such as the dust collector disclosed in my aforementioned prior patent. It is therefore intended in the appended claims to cover all such modifications as fall within the true spirit and scope of this invention.

What is claimed as new and desired to be secured by Letters Patent of the United States is:

1. A gas cleaner of the wet scrubber type comprising a housing, gas inlet means communicating with said housing for admitting contaminated gas to said housing, means in said housing for bringing said gas in contact with liquid particles, gas outlet means communicating with said housing for exhausting scrubbed gas from said housing, and an entrainment separator dividing the last-mentioned means from the two first-mentioned means, said separator including a trough member having vertically extending side portions, each side portion terminating at its respective upper end in a spiral tangentially positioned relative to said side portion toward the inside surface thereof, and an impingement member adjacent each side portion and including a first portion spaced from said side portion and inclined upwardly toward said side portion to form an upwardly converging fluid passageway therewith and connecting at its upper end to a generally scroll shape curved portion spaced eccentrically over said spiral to partially encircle said spiral providing a passageway therewith of diminishing cross-sectional area, said curved portion terminating in a bead portion tangentially therewith and radially outwardly of said curved portion.

2. A gas cleaner of the wet scrubber type comprising a housing, means for introducing a liquid spray in said housing, an entrainment separator in said housing, means for passing gas through said housing first through said liquid spray and then through said entrainment separator, said separator including a trough member having vertically extending side portions, a pair of impingement members associated with each trough member, one of each impingement members being adjacent to but spaced apart from each respective side portion and including a first portion forming an upwardly converging fluid passageway therewith and connecting at its upper end to a curved portion spaced eccentrically over said side portion to partially encircle said side portion and providing a passageway thereto of diminishing cross-sectional area.

3. An entrainment separator for separating liquid from gas comprising a first member having a generally vertically extending portion and terminating at its upper end in a spiral tangentially positioned relative to said vertically extending portion, a centrifugal impinger member having a first portion spaced from said vertical portion adjacent the side thereof remote from said spiral and inclined upwardly toward said first member to form an upwardly converging passageway therewith and connecting at its upper end to a generally scroll shape curved portion eccentrically spaced over said spiral and partially encircling said spiral to provide with said spiral a passageway of diminishing cross-sectional area communicating with the first-mentioned passageway, said curved portion terminating in a bead tangentially positioned relative thereto radially outwardly of said curved portion.

4. An entrainment separator as set forth in claim 3 above wherein said passageways together extend through an angle of approximately 225°.

5. An entrainment separator as set forth in claim 3 above wherein said first member includes means for collecting liquid which falls from the second-mentioned member.

6. An entrainment separator as set forth in claim 3 above wherein said vertically extending portion and said first portion are planar.

7. An entrainment separator as set forth in claim 3 above wherein said first member is a trough having a pair of said vertically extending portions forming opposite sides thereof, and wherein there is additionally provided a second centrifugal impinger member identical to the first-mentioned impinger member and associated with the second of said vertically extending portions.

8. An entrainment separator for separating liquid from gas comprising a first member having a generally vertical portion, and a centrifugal impinger member having a first portion spaced from said generally vertical portion, at least one of said portions being inclined upwardly relative to the other portion to form an upwardly converging passageway therewith, said impinger member additionally including a curved portion eccentrically spaced over said generally vertical portion encircling said portion to provide with said portion a generally arcuate passageway of diminishing cross-sectional area communicating with the first-mentioned passageway.

References Cited in the file of this patent

UNITED STATES PATENTS

| | | |
|---|---|---|
| 2,536,998 | Newcomb et al. | Jan. 2, 1951 |
| 2,546,259 | Fern | Mar. 27, 1951 |
| 2,896,740 | Drummond | July 28, 1959 |

FOREIGN PATENTS

| | | |
|---|---|---|
| 106,985 | Sweden | Mar. 30, 1943 |